United States Patent [19]

Nodier

[11] Patent Number: 5,752,736
[45] Date of Patent: May 19, 1998

[54] COLLAPSIBLE TRUCK BED COVER

[76] Inventor: Michael J. Nodier, 323 Woodruff St., Lake Charles, La. 70601

[21] Appl. No.: 599,767

[22] Filed: Feb. 12, 1996

[51] Int. Cl.⁶ ....................................... B60P 7/04
[52] U.S. Cl. ................... 296/100; 296/164; 296/159; 135/88.15
[58] Field of Search .................. 296/100, 167, 296/164, 159, 56, 3, 161, 173, 165; 135/88.01, 88.09, 88.13, 88.15, 88.07, 139, 143, 127, 157, 115, 114

[56] References Cited

U.S. PATENT DOCUMENTS

| | | |
|---|---|---|
| 136,456 | 3/1873 | Petersen et al. ............. 135/139 |
| 3,009,212 | 11/1961 | Makens . |
| 4,310,194 | 1/1982 | Biller ......................... 296/159 |
| 4,332,265 | 6/1982 | Baker .......................... 135/3 |
| 4,607,876 | 8/1986 | Reed ........................... 296/100 |
| 4,709,956 | 12/1987 | Bowman .................... 296/100 |
| 4,738,274 | 4/1988 | Heath .......................... 135/88 |
| 4,813,743 | 3/1989 | Hoover ...................... 296/100 |
| 4,964,669 | 10/1990 | Geier ....................... 296/100 X |
| 5,056,855 | 10/1991 | Moravsky ................... 296/98 |
| 5,066,063 | 11/1991 | Mullally ..................... 296/100 |
| 5,211,498 | 5/1993 | Huang ........................ 403/102 |
| 5,238,288 | 8/1993 | Chandler .................... 296/100 |
| 5,293,656 | 3/1994 | Chan ....................... 403/102 X |
| 5,299,849 | 4/1994 | Cook et al. ................ 296/100 |
| 5,353,826 | 10/1994 | Davis .......................... 135/88 |

FOREIGN PATENT DOCUMENTS 1395041  3/1965  France ................... 403/102

*Primary Examiner*—Joseph D. Pape
*Attorney, Agent, or Firm*—Jenner & Block

[57] ABSTRACT

A removable, collapsible truck bed cover (100) has a shell (102) of pliable material secured to a frame (200) via sleeves (114) on the underside of the shell (102). The one-piece frame (200) has vertical supports (202) and horizontal supports (206) pivotally attached to each other to attain an erect or locked position and a collapsed position. In the erect position, the horizontal supports (206) form a generally rectangular configuration similar to a plane defined by the top of a truck bed. The vertical supports (20) rest on the truck bed and extend the rectangular configuration of horizontal supports (206) above the top of the truck bed. Corner hinges (208) join two horizontal supports (206) with a vertical support (202). Center hinges (210) join each horizontal support (206) to another horizontal support (206). Thumb locks (234, 334) are employed in the hinges to lock the frame in the erect position.

12 Claims, 4 Drawing Sheets

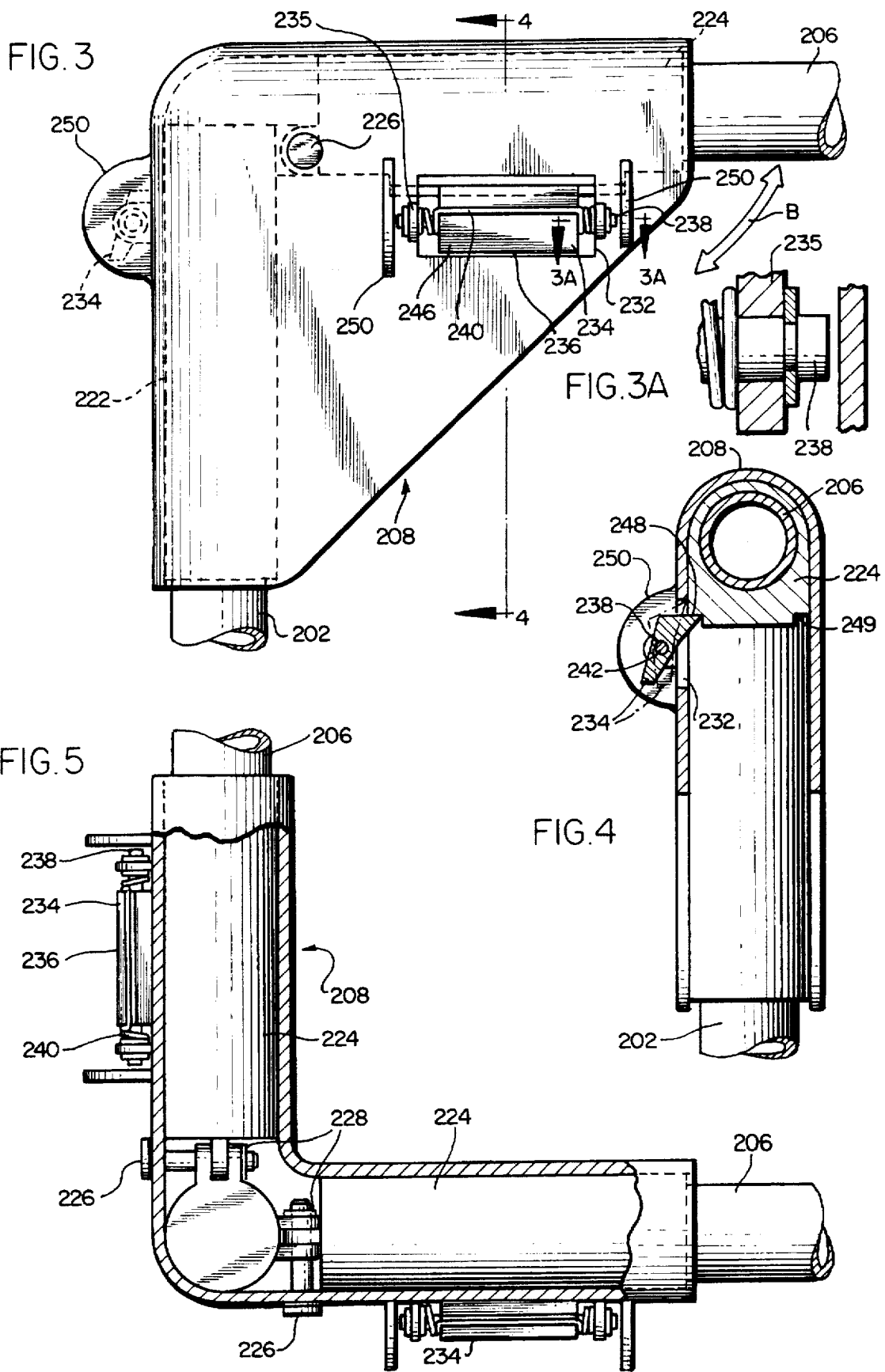

5,752,736

COLLAPSIBLE TRUCK BED COVER

FIELD OF THE INVENTION

This invention relates generally to covers for truck beds and the like, and in particular, to a removable and collapsible cover for truck beds.

BACKGROUND OF THE INVENTION

It is often desirable to cover the bed of a pickup truck to protect the contents from inclement weather and to provide a measure of security. Conventional truck bed covers are generally fabricated as a rigid plastic or metal unit. Such units are generally expensive to purchase, heavy in weight and require substantial storage space when not in use. These shortcomings make conventional truck bed covers unusable in situations requiring only temporary or sporadic use.

In an attempt to address the shortcomings of conventional truck bed covers, removable truck bed covers, such as those described in U.S. Pat. No. 4,813,734 issued to Hoover and U.S. Pat. No. 5,353,826 issued to Davis, have been designed. Unfortunately, these removable solutions generally require many parts. Therefore, a great deal of effort is required to assemble and disassemble the covers for use. Often the assembly and disassembly is so complex that one person cannot alone complete it.

Other attempts to overcome the shortcomings of conventional covers have included collapsible solutions such as U.S. Pat. No. 5,238,288 issued to Chandler and U.S. Pat. No. 3,009,212 issued to Makens. These solutions require modification of the truck, such as permanently fixing a collapsible framework to the bed of the truck. Modification of the truck is often undesirable. Further, modifications to the truck bed in many cases will restrict or eliminate uses otherwise available when the truck bed is uncovered. Permanent fixation of the cover or its framework also makes the cover nonportable and specific to a particular truck.

Therefore, a need exists for a cover for truck beds and the like that has a minimum number of parts that may be easily collapsed and readily removed from the truck bed.

SUMMARY OF THE INVENTION

Accordingly, it is an object of the present invention to provide a cover for use on the bed of a truck that is easily removable, collapsible, and has a minimum number of parts to facilitate easy erection.

It is another object of the present invention to provide a removable cover for use on a truck bed that does not require assembly and disassembly.

It is another object of the present invention to provide a portable cover for use on truck beds that requires no modifications to the truck.

The present invention provides a truck bed cover comprising a frame covered with a pliable or flexible shell. The frame is capable of attaining an erect position for use as a cover and a collapsed position wherein the cover may be stowed. The shell is generally shaped to the erected frame and has a plurality of sleeves that receive the frame to form an integral one-piece construction. The frame has a plurality of vertical supports and horizontal supports. The horizontal supports form a generally rectangular shape when the frame is in the erect position. At the corner portions of the generally rectangular shape, two horizontal supports are pivotally attached to a vertical support. In the erect position for use on a truck bed, the vertical supports extend from the walls of the truck bed up to the rectangular plane defined by the horizontal supports. Preferably, two horizontal supports are used for each side of the rectangular shape, such horizontal supports being pivotally joined to each other. Locking means are provided to lock the pivotally attached horizontal and vertical supports in the erect position. The locking means are releasable to collapse the frame and shell for stowing.

BRIEF DESCRIPTION OF THE DRAWINGS

FIG. 3 is a side view of a corner hinge of the frame shown in FIG. 2;

FIG. 3A is a cross-sectional view of a portion of the corner hinge shown in FIG. 3 taken along line 3A—3A;

FIG. 4 is a cross sectional view of the corner hinge shown in FIG. 3 taken along the line 4—4;

FIG. 5 is a top partially cut away view of the corner hinge shown in FIG. 3;

DETAILED DESCRIPTION OF A PREFERRED EMBODIMENT

Figure 1:
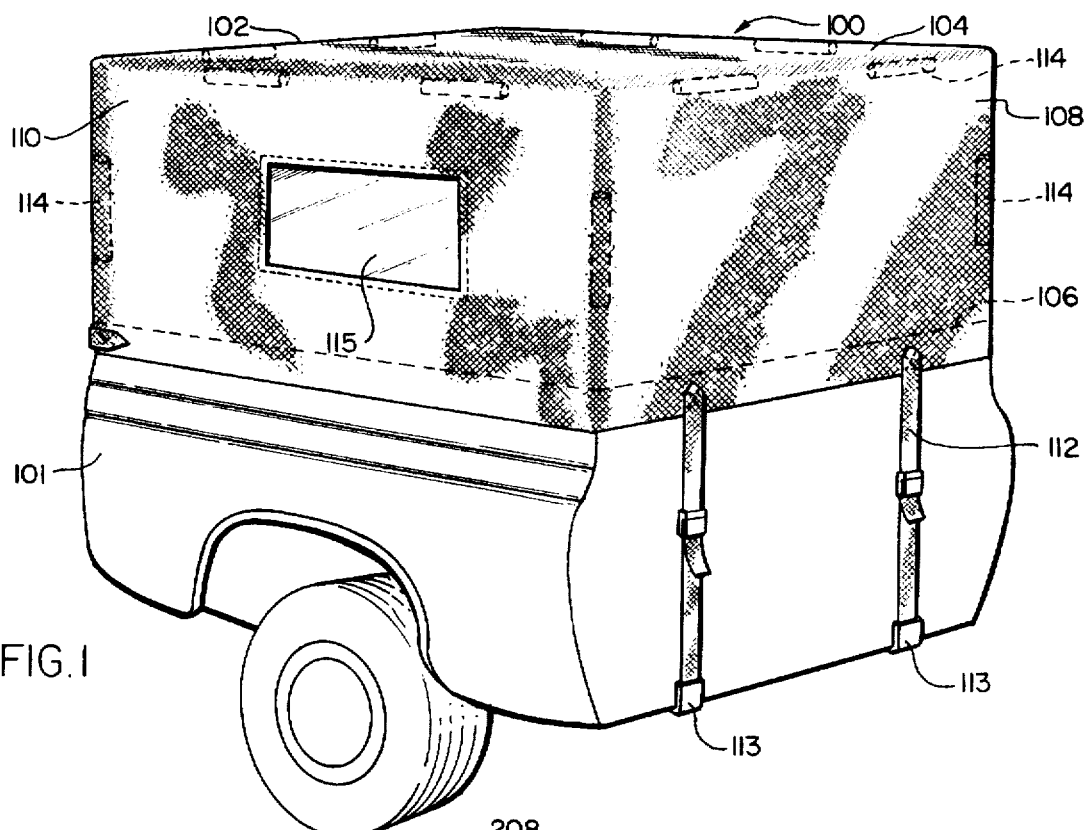
FIG. 1 is a perspective view of a collapsible truck bed cover made in accordance with the principles of the present invention, wherein the cover is in the erect position on the bed of a truck.

FIG. 1 is a perspective view of a preferred embodiment of a truck bed cover 100 made in accordance with the principles of the present invention. Truck bed cover 100 is shown in the erect position mounted on a truck bed 101. Truck bed cover 100 has a generally rectangular block shape formed by a shell 102 conforming generally to, and supported by a frame (not shown). Shell 102 is made of a pliable material, such as nylon or plastic.

Shell 102 has a top portion 104 that is generally parallel and above a plane defined by the top 106 of truck bed 101. Shell 102 also has a front portion 108 that extends from top portion 104 to just beyond the top 106 of truck bed 101 at the end of truck bed cover 100 near the cab (not shown) of the truck. Similarly, a back portion (not shown) extends from the top portion 104 of the shell 102 to just beyond the top 106 of truck bed 101 at the end opposite the cab of the truck. Side portions 110 extend from the top portion 104 of the shell 102 down to the sides of truck bed 101 just beyond the top 106 of the truck bed. A window 115 may be formed in side portion 110 of shell 102. Adjustable straps 112 are attached to the front portion 108 and back portion for releasably securing shell 102 to the truck bed. Metal clamps 113 hook the straps 112 to the bottom of truck bed 101. Preferably, the back portion of shell 102 has a flap that is releasably secured to the shell 102 for access to the truck bed without removal of truck bed cover 100. Shell 102 has a plurality of sleeves 114 shown in phantom. Sleeves 114 are preferably attached to the underside of shell 102 for receiving a frame.

Figure 2:
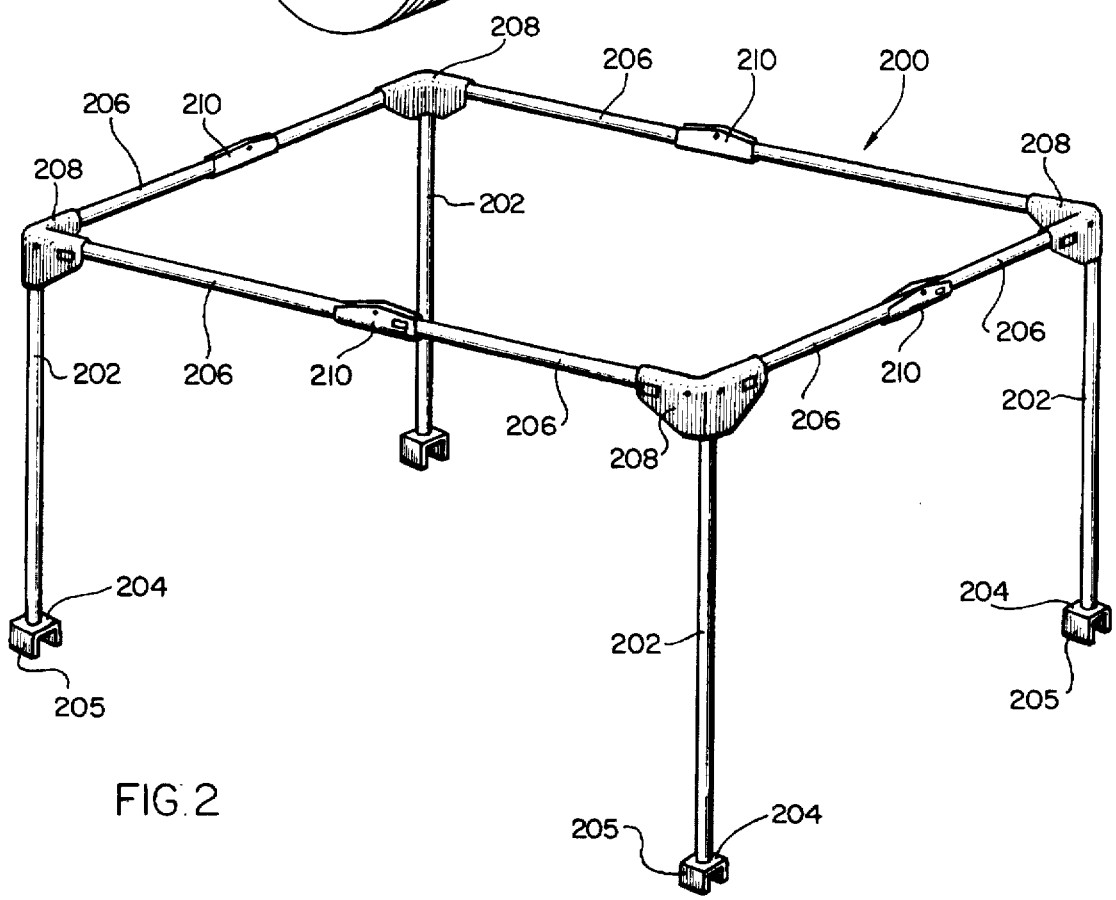
FIG. 2 is a perspective view of a frame for the truck bed cover shown in FIG. 1.

FIG. 2 shows a preferred embodiment of a frame 200 that may be used with truck bed cover 100, shown in FIG. 1. Frame 200 is shown in the erect or locked position. For clarity shell 102 is not shown, but in normal operation shell 102 is secured to frame 200 via sleeves 114.

Frame 200 has four vertical supports 202 that extend upwardly from base portions 204, which rest on the top 106 of the truck bed when the truck bed cover 100 is in the erect position. Base portions 204 preferably have sides 205 that are sized for a particular truck style. Each vertical support 202 joins two horizontal supports 206 at a corner hinge 208. Preferably, each horizontal support is joined with another horizontal support 206 by a center hinge 210. In the erect position, corner hinges 208 and center hinges 210 releasably lock horizontal supports 206 and vertical supports 202 in relationship to each other. Preferably the horizontal supports 206 lock perpendicular to each other and perpendicular to vertical supports 202. Horizontal supports 206 lock together via center hinges 210 and corner hinges 208 to generally form a rectangular configuration. Vertical supports 202 define the height of the truck bed cover by extending above the top of the truck bed the rectangular configuration defined by the horizontal supports 206, corner hinges 208 and center hinges 210.

FIGS. 3, 4 and 5 show respectively, a side view, a cross sectional view taken along line 4—4, and a top view of corner hinge 208. Corner hinge 208 pivotally joins a vertical support 202 with two horizontal supports 206. Corner hinge 208 has a rigid body 220 that encompasses three sleeves that support the horizontal and vertical supports. Vertical support 202 is held within the corner hinge 208 by vertical support sleeve 222. Horizontal supports 206 are held in the corner hinge 208 by horizontal support sleeves 224. Each horizontal support sleeve 224 is pivotally attached to vertical support sleeve 222 by a pin 226. Each horizontal support sleeve 224 may pivot with respect to its associated vertical support sleeve 222 independent of other horizontal support sleeves in a direction shown by arrow B. Each pin 226 is held in place by a clip 228, which frictionally engages a groove (not shown) in pin 226 thereby securing pin 226 in corner hinge body 220.

Two apertures 232 are formed in the corner hinge body 220 for receiving thumb locks 234. Thumb lock 234 allows for releasing and securing of horizontal support 206 in a position generally perpendicular to vertical support 202. In the erect or locked position, thumb lock 234 provides a detente stop that prevents sleeve 224 from pivoting downward under the force of gravity.

Thumb lock 234 has a body portion 236, a pin 238 and a spring 240. Body portion 236 is generally rectangular in shape with some appreciable amount of thickness. Through the center of the thumb lock 234 is an aperture 242 for receiving pin 238. The inner diameter of the aperture 242 and the outer diameter of pin 238 are sized such that the thumb lock body portion 236 may freely rotate about pin 238. Thumb lock 234 is held in aperture 232 by the frictional engagement of grips 235 around pin 238, as best seen in FIG. 3A. Spring 240 biases the top of the body portion 236 of the thumb lock 234 into the aperture 232 of the hinge body 220. The top of the body portion 236 of thumb lock 234 may be retracted from aperture 232, thereby releasing horizontal support 224, by applying a force on the bottom 246 of the thumb lock 234. Two protrusions or ridges 250 located on both sides of thumb lock 234 shield thumb lock 234 from being inadvertently biased by shell 102.

As best seen in FIG. 4, horizontal support sleeve 224 has an indentation 248 that in cooperation with the top of thumb lock body portion 236 provides a detente for locking the horizontal support 206 in place. Thumb lock 234 may be moved to the position shown in phantom in FIG. 4 to release horizontal support 206. FIG. 4 shows one thumb lock 234. However, another thumb lock may be used opposite thumb lock 234 in cooperation with indentation 249 for securing horizontal support 206 in position.

Figure 6:
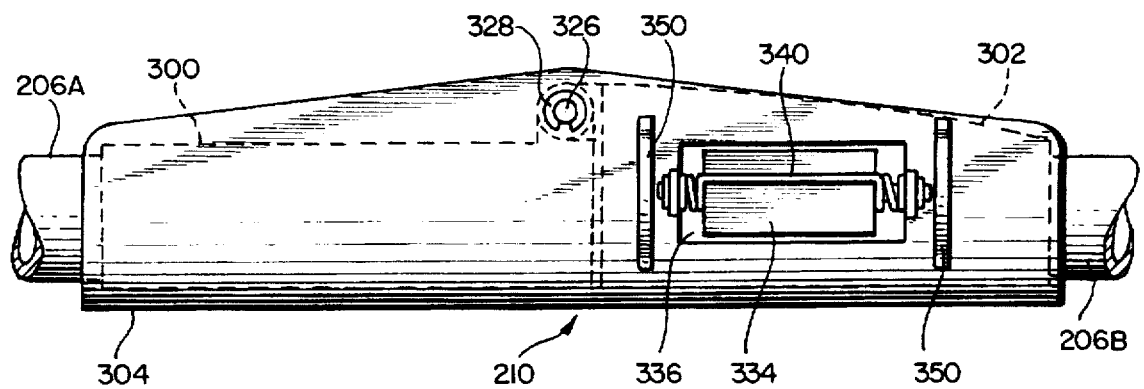
FIG. 6 is a side view of a center hinge of the frame shown in FIG. 2, wherein the frame is in the locked or erect position.
Figure 7:
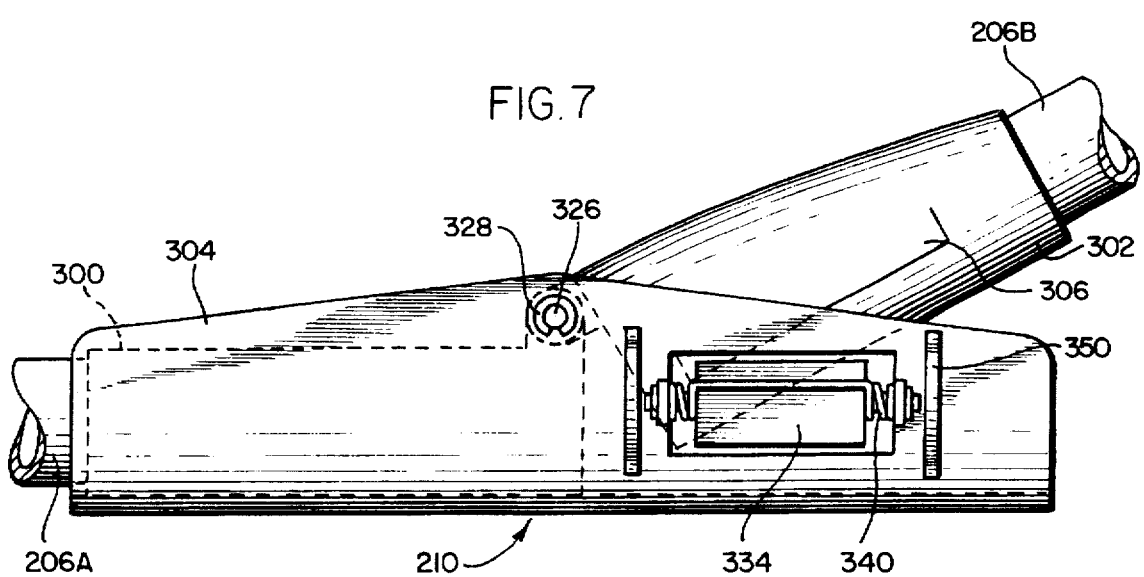
FIG. 7 is a side view of a center hinge of the frame shown in FIG. 2, wherein the frame is in a partially collapsed position.
Figure 8:
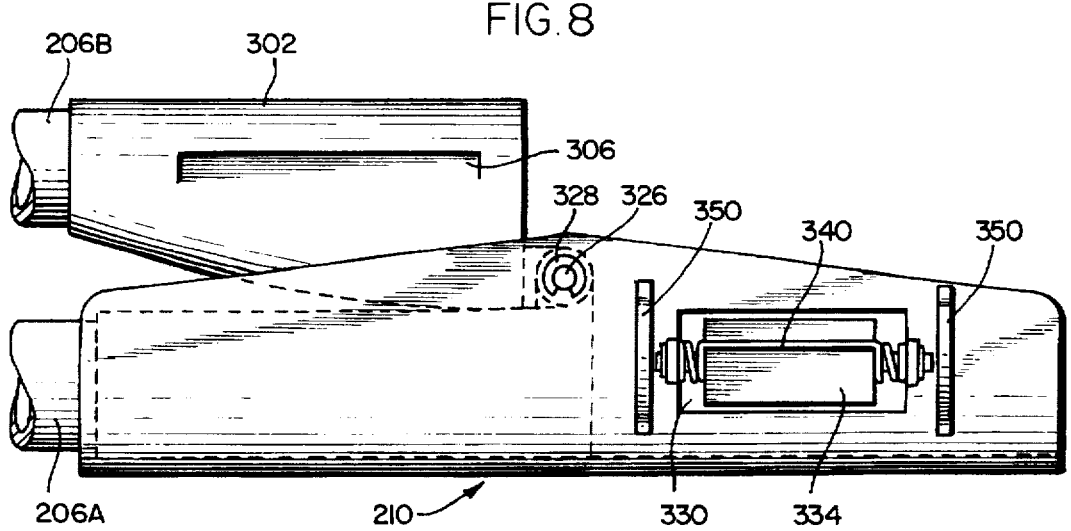
FIG. 8 is a side view of a center hinge of the frame shown in FIG. 2, wherein the frame is in the completely collapsed position.

FIGS. 6-8 show side views of center hinge 210 in the locked or erect, partially collapsed and completely collapsed positions, respectively. Two horizontal supports 206A, 206B are pivotally attached to center hinge 210. Horizontal support 206A is attached to fixed sleeve 300 and horizontal support 206B is attached to a swinging sleeve 302. Fixed sleeve 300 is affixed within the center hinge body 304. Swinging sleeve 302, which houses horizontal support 206B, is pivotally attached to a pin 326 inserted through the center hinge body 304, fixing sleeve 300 in relation to swinging sleeve 302. A clip 328 frictionally engages a groove (not shown) in pin 326. A thumb lock 334 is frictionally engaged and held by grips 335 in an aperture 336. Thumb lock 334 is biased by spring 340 into aperture 336 such that when the horizontal supports 206A, 206B are in the locked or erect position, thumb lock 334 is biased into a notch 306 in the swinging sleeve 302. Notch 306 is a detente stop that locks swinging sleeve 302 in the closed or erect position. The center hinge body 304 holds swinging sleeve 302 parallel to fixed sleeve 300 while thumb lock 334 prevents upward movement of swinging sleeve 302. Ridges 350 prevents thumb lock 234 from being inadvertently biased by shell 102, in a manner similar to ridges 250 in FIGS. 3-5.

Figure 9:
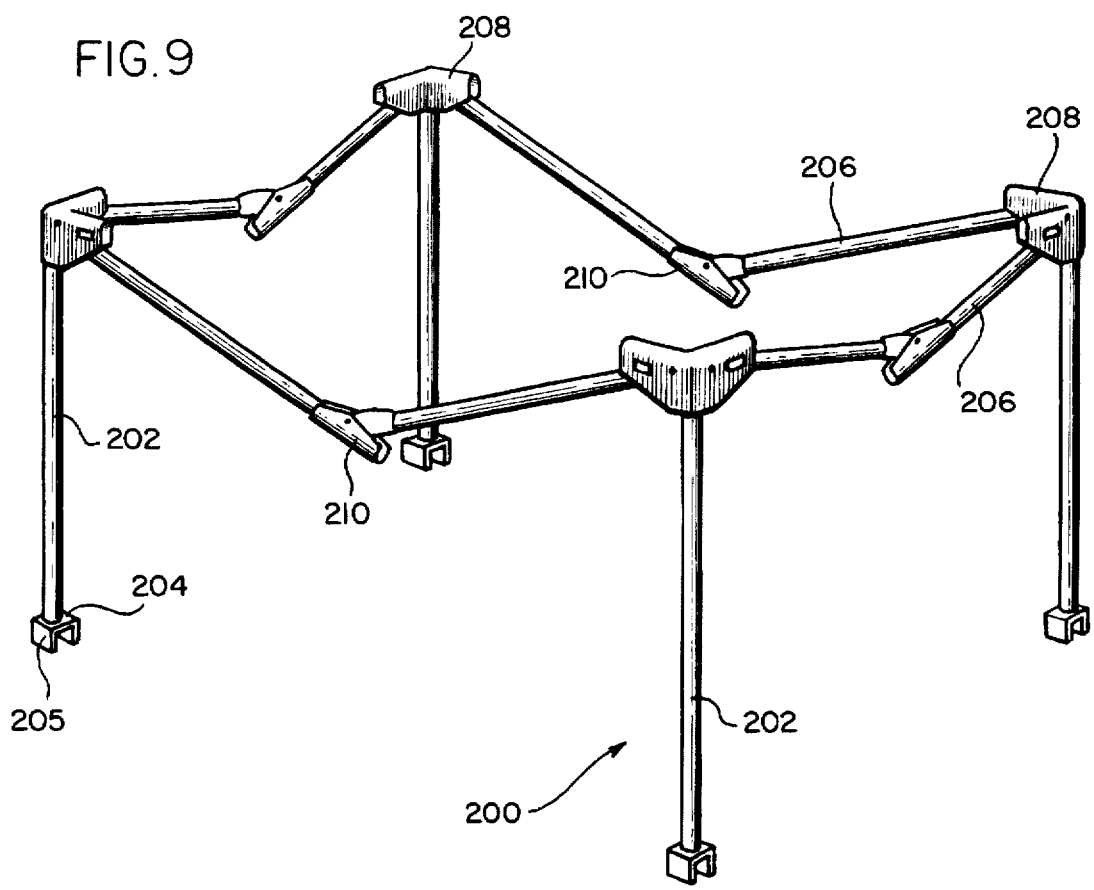
FIG. 9 is a perspective view of the frame shown in FIG. 2 in a partially collapsed position.
Figure 10:
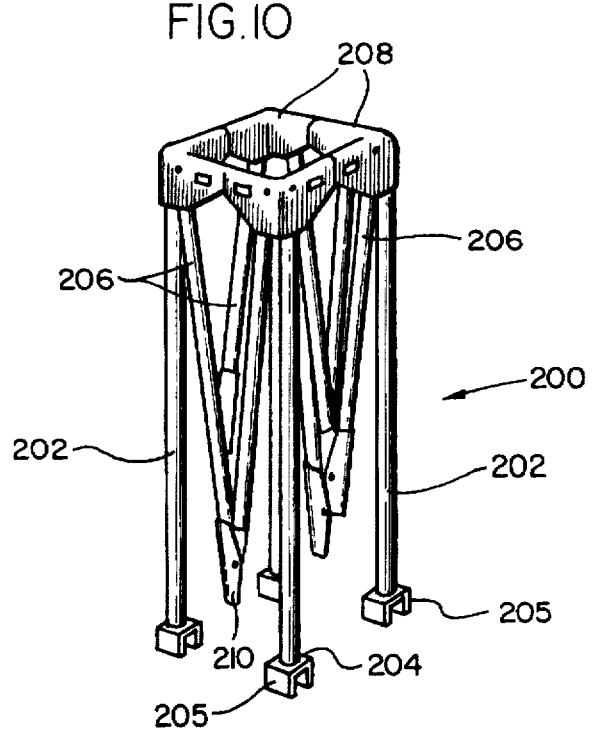
FIG. 10 is a perspective view of the frame shown in FIG. 2 in a completely collapsed position.

FIGS. 9 and 10 show, respectively, perspective views of frame 200 in the partially collapsed and completely collapsed positions. Shell 102 is omitted from the FIGS. 9 and 10 for clarity, but preferably shell 102 remains integral with frame 200 during collapse of the truck bed cover. When the frame is in the completely collapsed position, vertical supports 202 are substantially parallel to each other and horizontal supports 206 form a plurality of "V" configurations with acute angles at the points of intersection at center hinges 210. This configuration allows compact storage of the truck bed cover.

In normal operation, the truck bed cover 100 is first extended from the completely collapsed position shown in FIG. 10 to a partially collapsed position shown in FIG. 9. The pivotal attachments at corner hinges 208 and center hinges 210 allow the horizontal supports 206 and vertical supports 202 to be freely moved into the desired position. The cover is then moved from the partially collapsed position shown in FIG. 9 to the locked or erect position shown in FIGS. 1 and 2. As the cover is moved from the partially collapsed to the locked or erect position, the thumb locks 234 in corner hinges 208 are biased out of the corner hinge 208 by frictional forces from horizontal support sleeve 224. Once the indentation 248 in horizontal support 206 moves beyond the top of the thumb lock 234, the spring 240 biases the thumb lock 234 to form a detente with indentation 248 holding the horizontal support perpendicular to the vertical support. Similarly, as the truck bed cover 100 is moved from the partially collapsed position to the locked or erect position, the swinging sleeve 302 biases thumb lock 336 out of the center hinge body 304 allowing horizontal support 206B to attain a position parallel to horizontal support 206A. Once notch 306 has moved beyond the bottom of thumb lock 334, the spring 340 biases thumb lock 334 to form a detente stop with notch 306. Once erect, the frame may be placed in position on the top of a truck bed. Alternatively, the cover is easily made erect while in position on the top of a truck bed. Straps 112, and additional straps or other hardware if desired, are used to attach the truck bed cover to the truck bed and pull the shell taut.

Removal of the truck bed cover for storage requires first releasing straps 112 and any other hardware used for securing. Then the thumb locks in the corner hinges 208 and center hinges 209 are released to allow the horizontal supports to freely pivot to the partially collapsed position shown in FIG. 9. After all the thumb locks are released, the truck bed cover 100 may be compressed into the completely collapsed position as shown in FIG. 10.

As described above, a removable and collapsible truck bed cover, in accordance with the principles of the present invention, has an integral one-piece construction that does not require assembly and disassembly and is portable.

Whereas the present invention has been described with respect to preferred embodiments thereof, it will be understood that various changes and modifications will be suggested to one skilled in the art and it is intended that the invention encompass such changes and modifications as fall within the scope of the appended claims.

What is claimed is:

1. An apparatus comprising a truck bed cover in combination with a truck bed, the truck bed comprising:
   horizontally oriented sides that define a top of the truck bed;
   the truck bed cover being adapted to rest on the top of the truck bed, the truck bed cover comprising:
   a collapsible, removable frame having an erect position and a collapsed position;
   a shell of pliable material having a plurality of sleeves for receiving said frame, said shell being shaped by said frame;
   said frame having a plurality of vertical supports and horizontal supports;
   said horizontal supports being adapted to form a rectangular configuration with four corners when said frame is in the erect position, wherein at each of said corners formed by said horizontal supports, said horizontal supports are pivotally attached to one of said plurality of vertical supports; and
   each side of said configuration formed by said horizontal supports comprising at least two horizontal supports pivotally attached to each other.

2. The apparatus of claim 1 further comprising:
   locking means for holding said frame in the erect position.

3. The apparatus of claim 2 wherein said locking means is releasable to allow said frame to attain the collapsed position.

4. The apparatus of claim 1 wherein said vertical supports are pivoted to be substantially parallel to each other and said horizontal supports are pivoted to form a plurality of "V" configurations with acute angles at the points of intersection of said horizontal supports when said frame is in the collapsed position.

5. The apparatus of claim 1 wherein said vertical supports are perpendicular to said horizontal supports when said frame is in the erect position.

6. The apparatus of claim 1 wherein said vertical supports terminate in a base portion with side portions adapted to fit on top of a truck bed.

7. An apparatus comprising a truck bed cover in combination with a truck bed, the truck bed comprising:
   horizontally oriented sides that define a top of the truck bed;
   the truck bed cover being adapted to rest on the top of the truck bed, the truck bed cover comprising:
   a frame;
   a shell having a plurality of sleeves that receive the frame;
   said frame having a plurality of vertical supports and horizontal supports;
   said frame having a plurality of corner hinges and center hinges;
   each corner hinge housing two horizontal support sleeves pivotally attached to a vertical support sleeve;
   each center hinge housing a fixed sleeve and a pivotally attached swinging sleeve;
   wherein each horizontal support is attached at one end to one of said horizontal support sleeves and is attached at an opposite end to one of either said fixed sleeve and said swinging sleeve; and
   wherein each vertical support is attached at a first end to a vertical support sleeve.

8. The apparatus of claim 7 wherein each vertical support is attached at a second end to a base adapted to rest on top of the truck bed.

9. The apparatus of claim 7 wherein each corner hinge has locking means for holding the two horizontal support sleeves perpendicular to each other and perpendicular to the vertical support sleeve.

10. The apparatus of claim 7 wherein each center hinge has locking means for holding said fixed sleeve and said swinging sleeve parallel to each other.

11. An apparatus comprising a truck bed cover in combination with a truck bed, the truck bed comprising:
    horizontally oriented sides that define a top of the truck bed;
    the truck bed cover being adapted to rest on the top of the truck bed, the truck bed cover comprising:
    a frame capable of attaining an erect position and a collapsed position;
    a shell having a plurality of sleeves that receive the frame;
    said frame having a plurality of vertical supports and horizontal supports;
    said frame having a plurality of corner hinges and center hinges;
    wherein when said frame is in the erect position, each corner hinge holds two horizontal supports perpendicular to each other and perpendicular to an attached vertical support; and
    wherein each center hinge pivotally attaches two horizontal supports, each horizontal support being attached to said center hinge at an end of the horizontal support opposite an end of the horizontal support attached to a corner hinge.

12. The apparatus of claim 11 wherein when said frame is in the collapsed position, the plurality of vertical supports are substantially parallel to each other and the plurality of horizontal supports form acute angles at a point of intersection between two of said plurality of horizontal supports.

* * * * *